United States Patent Office 3,476,327
Patented Nov. 4, 1969

3,476,327
SYSTEM FOR NUMERICALLY CONTROLLING LARGE MASSES
Verne E. Vawter, National City, Calif., assignor to Rohr Corporation, Chula Vista, Calif., a corporation of California
Continuation-in-part of application Ser. No. 196,310, May 21, 1962. This application Nov. 29, 1966, Ser. No. 621,077
Int. Cl. B65h *81/06;* H02p *1/54*
U.S. Cl. 242—18         9 Claims

ABSTRACT OF THE DISCLOSURE

A multi-axis filament winding machine is disclosed having X, Y, Z and α and β axis movements. A filament wound object having a large mass of the order of 500,000 pounds is mounted on a mandrel or table for rotation about the Z—Z axis. A relatively low mass carriage is mounted for movement along the X—X axis which is disposed parallel to the Z—Z axis. A low mass ram is mounted on the carriage for movement along the Y—Y axis. A low mass payoff head for directing filaments to the table supported object is mounted on the ram for movements thereon about the α and β axes. The Z axis movement has high inertia and low response and consists of the table and its supported object, a table drive, table servo power, and a table velocity control. The other axis movements each has low inertia and high response and each consists of the carriage, ram or payoff head, as the case may be, a drive, servo power, and a distributor. The axis movements are numerically controlled. The high response, low inertial axis movements are each controlled by position and rate information. The low response, high inertia axis movement, however, is controlled by position information only. The resultant free motion or position response of the massive table and its supported object is measured by a pulse transducer whose pulses replace those of a conventional fixed synchronizing clock in timing the distributors of the other axis movements. Thus, in this system, the low response, high inertia Z axis movement acts as a "master axis movement" and the high response, low inertia, X, Y and α, β axis movements act as "slave axis movements." As a result, no velocity error is introduced into the system by the sluggish "master axis movement" and the low error coefficients and high responses of the other axis movements are retained.

This application is a continuation-in-part of the application of Verne E. Vawter, Ser. No. 196,310, filed May 21, 1962, now abandoned, for System for Numerically Controlling Large Masses.

*Prior art*

This invention relates generally to numerical control systems and more particularly to a method and system of numerically controlling a large multi-axis machine such, for example, as a filament winding machine, wherein one axis movement consists of a large mass or moment of inertia necessitating a servo drive system of relatively low natural frequency while all the other axis movements of the machine are such as to be capable of utilizing high response drives with very high natural frequency. An axis movement, for purposes herein, is defined as the structure including a tool or workpiece, as the case may be, which is moved by servo control along or about an axis of a multi-axis machine thus, in a multi-axis filament winding machine, such as hereinafter disclosed, having a carriage for moving a filament payoff head along an X axis, the X axis movement would be defined as including the carriage, the carriage drive, the carriage servo power, and the carriage distributor.

In the normal numerical control of a multi-axis machine, it is customary to coordinate all of the axis movements of the machine by a clock which is the master synchronizing system. If all of the servo systems have identical velocity error coefficients, no steady state errors will be introduced by the controlling system. To this end, it is also customary in the prior art numerical control systems to adjust the error coefficients of the high response drives to that of the lowest response drive. This, however, has the disadvantage in that it makes the machine very slow in operation, if accuracy is to be maintained.

In the case of a large filament winding machine, the error coefficient of the mandrel or table will be inordinately large, as where the table load may comprise a 500,000 pound mass. To position a 500,000 pound mass by a control system utilizing conventional numerical controlled servo techniques would be prohibitive in cost to design and operate, would be impracticably slow in operation, and would introduce excessive winding errors. A motor to turn the table in such case would be of the order of 150 h.p., and a much larger motor would be required to servo control a table load of such size. A normal expected requirement of the mandrel to be within a few inches of the correct numerical position at any instant, while moving at a velocity of the order of 2,400 inches per minute, would be impractical of achievement.

*Summary of the invention*

In accordance with the method and system of the present invention for numerically controlling large masses, the aforesaid disadvantages and difficulties inherent in the use of conventional numerical controlled servo techniques for the purpose, are obviated and overcome by numerically controlling by both position and rate information several high response, low inertia axis movements employed to position the payoff head of the filament winding machine, and by numerically controlling by position information only the low response, high inertia axis movement employed to position the table of the filament winding machine so that the free motion or position response of the massive, sluggish table axis movement, acting as a "master axis movement," may be used as a timing device to time, that is, to modulate or override the rate responses of the high response axis movements which thus act as "slave axis movements." To this end, as will appear more fully as the description proceeds, the instantaneous positions of the high inertia master axis movement is measured by a pulse transducer and these pulses become the clock for the numerical distributing system of the high response slave axis movements. In accordance with this novel inventive concept, it is not important, as it is in the prior art systems, that the table axis movement achieve such position-time relationships as may be anticipated and called for by the programmed position information since the movements of the table are not timed by a synchronizing clock, as in the prior art arrangements, and the numerical distributing systems for the other axis movements are not timed by the fixed synchronizing clock as in the prior art numerical control systems, but rather are timed by the instantaneous positions of the table movement. By reason of this new inventive concept of numerical control, the large error coefficient of the servo drive for the high inertia axis movement may be tolerated while retaining the low error coefficients and high responses of the drive systems for the other axis movements.

The net result of this new and improved numerical control system is that the numerical path process is not disturbed notwithstanding the fact that more or less time may be required to bring the table up to speed, or to slow it down, or to stop the same at any time. There is no velocity error introduced into the path by the table axis movement. Accordingly, the velocity errors of the other axis movements constitute the real errors of the system and must be held to an absolute minimum for optimum performance. This requirement, however, is easily met since, by definition, the slave axis movements are low mass, low inertia, high response servo powered systems having extremely low velocity errors or integrator velocity errors in response to zero steady state position signals.

Objects of the invention

An object of the present invention, therefore is to provide a new and improved method and system of numerical control having particular utility in controlling large masses.

Another object is to provide such a method and system which is particularly applicable to multi-axis machines such as filament winding machines.

Another object is to provide such a method and system in which the response time of a low inertia axis movement is not reduced by reason of the inordinate mass or inertia of one of the axis movements of the machine.

Still another object in a system of numerical control for a multi-axis machine is to provide a method and system of control wherein a high inertia axis movement serves as a master for controlling one or more high response slave axis movements.

Yet another object in such a master-slave system is to numerically control the high inertia master axis movement by programmed position information without regard to its instantaneous position response to the programmed information and to use the motion of this master axis movement as a timing device or clock for modulating the programmed motions of the slave axis movements.

Still another object in a master-slave system as aforedescribed is to retain the high response and low error coefficients of the low mass, low inertia slave axis drives notwithstanding the inherently low response and high error coefficient characteristics of the large mass or high inertia master axis movement.

Still other objects, features and advantages of the present invention are those inherent in or to be implied from the novel construction, combination and arrangement of the parts comprising the entire system as disclosed in the accompanying drawings wherein:

Although not limited thereto, the present invention is well suited for application to the numerical control of a filament winding machine, and the drawings depict such application. As thus depicted, the invention resides in the numerical control by position information of a large mass, high inertia master axis movement such as a massive filament wound device supported on a mandrel, the mandrel and its masive load being permitted to rotate uncontrolled and without regard for the sluggishness of the response of the same to the position commands. The invention further resides in the numerical control by position and rate information of at least one low mass, low inertia, high response slave axis movement such as the payoff head, ram, and carriage axis movements which support and direct the filaments to the object being wound. The numerical rate information of the slave axis movements is modulated by clock pulses generated by the rotational movement of the mandrel and its massive load in response to the programmed mandrel position information.

Although the claimed inventive concept of numerical control is applicable to a master axis movement and only one slave axis movement, the efficacy of the same for the purpose is the better demonstrated, as in the herein disclosed highly sophisticated 5-axis machine control system wherein numerical control is applied to each of the four slave axis movements, namely, to the carriage, ram and $\alpha$ and $\beta$ axis movements of the payoff head.

With specific reference to the drawings, a carriage moves along the X axis and supports a ram or crossfeed which moves along the Y axis. The X axis of the carriage parallels the Z axis of the table or mandrel which supports the large mass of the filament wound object or load, the mandrel and the filament wound object thereon being mounted for rotation about the Z axis. The motion of the ram along its Y axis is thus normal to the X and Z axes. A filament payoff head is supported on the ram and moves thereon through angular movements about the $\alpha$ and $\beta$ axes such that the filament may be directed tangent to the workpiece or object on the mandrel.

Figure 1:
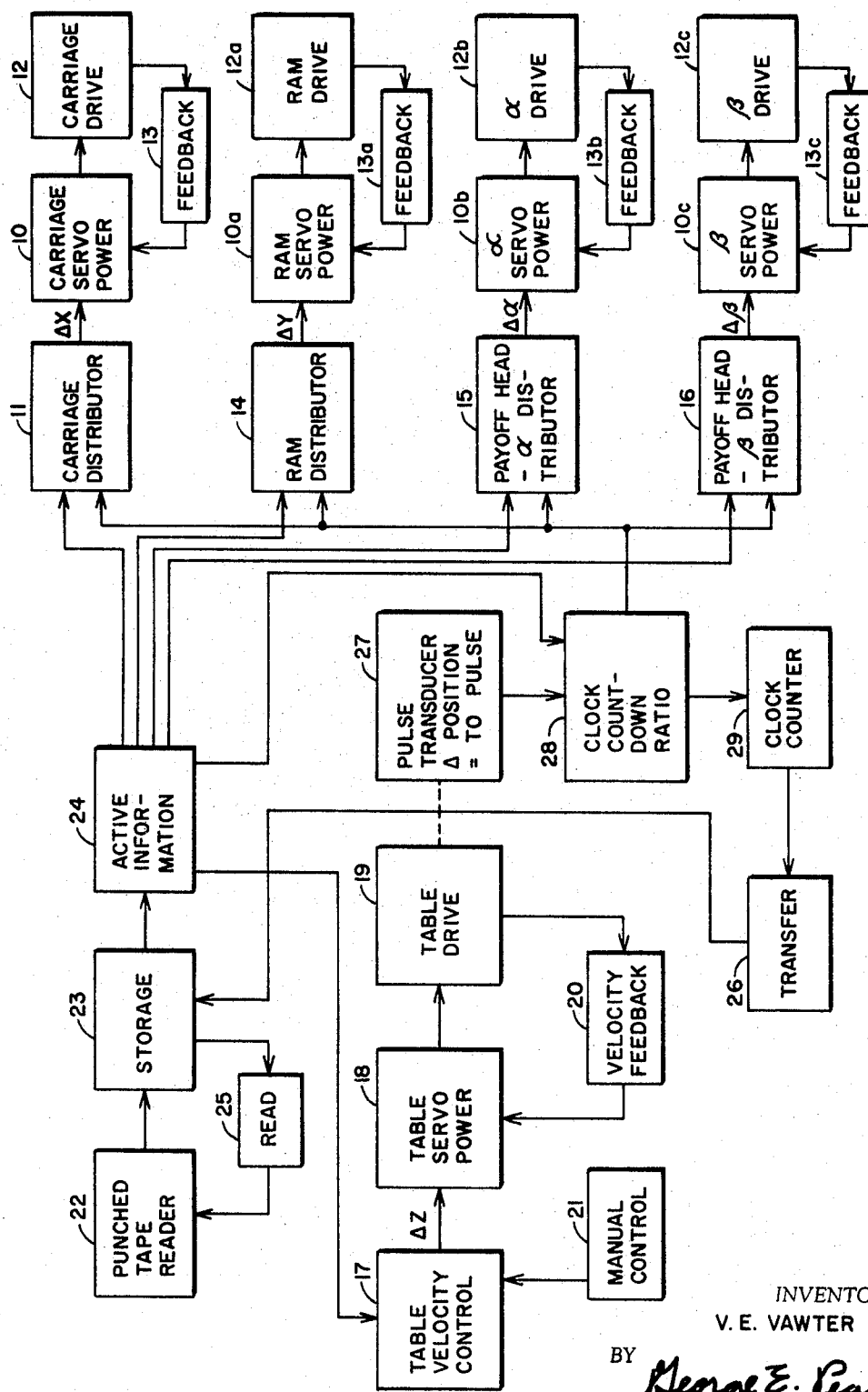
FIG. 1 is a block diagram of the electrical system of a numerically controlled multi-axis filament winding machine.
Figure 2:
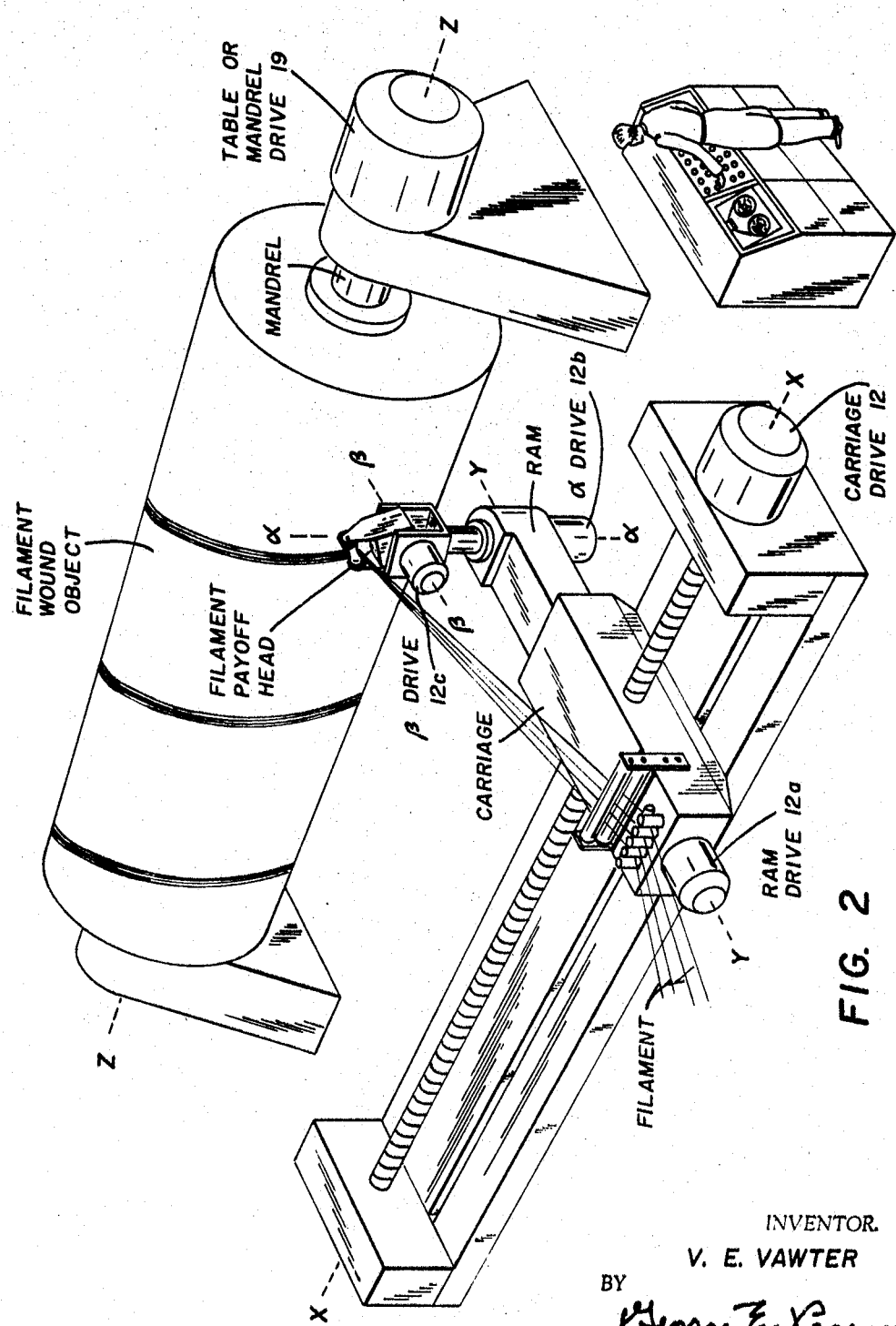
FIG. 2 is a schematic showing of the filament winding machine.

The block diagram showing of FIG. 1 identifies the various elements of the numerical control system but does not provide a showing physically of these elements or of the axis relationship of these elements as heretofore described and as labelled in the blocks. FIG. 2 provides this physical showing and axis relationship, and the $\alpha$ and $\beta$ axis movements depicted for the filament payoff head are those required, as hereinbefore set forth, in order that the filament be directed tangent to the mandrel, or strictly speaking, tangent to the workpiece mounted on the mandrel. As depicted in FIG. 2, the payoff head is shown having angular positions about the $\alpha$ and $\beta$ axes sufficient to direct the filament from the payoff head as required by the particular helical winding which is being applied to the object wound on the the mandrel.

In the arrangement disclosed in FIG. 2, the payoff head is provided with drives 12b and 12c to make provision for control of the $\alpha$ and $\beta$ axis movements which include the payoff head and these drives and other elements as hereinafter described with reference to the block diagram showing of the drawings. It should be understood that the same helical winding can be achieved in the numerical control of only the carriage, ram, and mandrel axis movements, in which case the angular movements of the payoff head about the $\alpha$ and $\beta$ axes are left merely to passively follow paths directed by the tensioned filaments on the payoff head. That is to say, the payoff head, by reason of the tensioned filaments thereon, would assume positions as required by the helical wrap of the filament on the object and the payoff head would pivot about the $a$ and $\beta$ axes as required to properly address the filament to the object to achieve these end results as envisioned by the taped numerical data.

In the sophisticated 5-axis arrangement depicted in FIG. 2, the angular movements about the $\alpha$ and $\beta$ axes are numerically controlled and directed by the taped numerical control information rather than passively assuming positions in accordance with a particular direction taken by the filaments as determined by the numerically directed movements of the ram and carriage as in a 3-axis controlled system. The 5-axis system is truly a multi-axis machine in which the ability of the massive axis mandrel movement to provide slaved control of the other low inertia axis movements is fully tested, and the 5-axis filament winding machine is thus a good example of the application of the master-slave numerical control system of the present invention. This is why the 5-axis filament winding control system is presented in the instant application as a preferred embodiment of the invention. It will be understood, however, that the inventive control concept and principle of the invention is just as applicable to a 2-axis system in which one of the axis movements is massive and sluggish and is caused to time or modulate the rate of response of the other low inertia or high response axis movement to its numerical control data.

The numerical information representing table velocity or position information is transformed into an analog incremental voltage designated ΔZ by the table velocity control 17, and the table servo power 18 amplifies this low power electrical velocity signal into the necessary incremental power for operation of the table drive 19 which may be an electric or hydraulic motor. A velocity feedback 20 is provided to decrease the time constant and increase the accuracy of the table velocity or position response.

A manual control 21 is provided for velocity override and manual operation.

The information to run the machine is in the form of numerical punched tape data which is read by the punched tape reader 22 into the storage or memory 23. When the machine is started, this data is transferred to active information serially read into storage 23, all in a conventional manner. Similarly, when a signal is received from transfer 26, which means that the table has moved by a predetermined increment, new information is shifted from storage 23 to active information 24.

The tape data is prepared on the basis that the table axis movement is programmed in even increments of movements with a power of 10 divider. These increments are measured by a pulse transducer 27 operatively coupled to and driven by the table axis movement to thereby provide an instantaneous indication or measure of the table position. This pulse transducer may be of any type suitable for the purpose such, for example, as the "Optisyn" shaft angle encoder manufactured by the Dynamics Research Corporation of Stoneham, Mass., which transducer is of the zero velocity type giving pulses from just off zero velocity all the way up to the magacycle range and wherein a photo-electric chopper design is utilized incorporating low time constant photo cells.

A clock countdown ratio 28 is controlled by pulses received from transducer 27 and rate information received from active information 24. As aforementioned, the table axis movement is programmed in even increments with a power of 10 divider. The delta, or differential move data, for the other axis movements is scaled on the basis of the table motion multiplier. For large movements of the table, compared to the aforesaid ΔX, ΔY, Δα and Δβ movements of the carriage, ram, and payoff head, the punched tape commands a table pulse divider ratio to allow the use of smaller numbers for the delta X, Y, α and β movements, real time being a consideration only for the table velocity control.

A clock number counter 29 determines when the table has moved its equally spaced interval and then operates the transfer 26 to shift the new information from storage 23 to active information 24, as aforementioned, to thus repeat the cycle.

The clock pulses from clock countdown ratio 28 are fed to distributors 11, 14, 15 and 16, and it will be understood that the position or motion information respectively provided thereto from active information 24 allows a movement less than that called for by the number of pulses coming from the clock countdown ratio 28. It will also be understood that each distributor allows its delta motion number of clock pulses to be passed on to its associate power drive in an evenly distributed and conventional manner.

From the foregoing, it should now be apparent that a numerical control system has been provided which is fully adapted to fulfill the aforestated objects of the invention. It will also be apparent that a method of control has been provided which generally comprises the steps of numerically controlling the velocity of a high inertia master axis movement by position information only and without critical regard for its position response, establishing the motion of the high inertia master axis movement as a master clock, and numerically controlling at least one high response slave axis movement by both position and rate information and modulating the rate information thereof under control of the clock thus afforded by the master axis movement.

This invention may be embodied in other forms or carried out in other ways without departing from the spirit or essential characteristics thereof. The present embodiment of the invention is therefore to be considered as in all respects illustrative and not restrictive, the scope of the invention being indicated by the appanded claims, and all changes which come within the meaning and range of equivalency of the claims are intended to be embraced therein.

Having thus described my invention, what I claim as new and useful and desire to secure by Letters Patent is:

1. The method of numerical control of a multi-axis machine having a high inertia, low response master axis movement and at least one low inertia, high response slave axis movement, comprising the steps of numerically controlling the master axis movement by programmed position information only and without regard for the motion response of the master axis movement with respect to said position information, and numerically controlling the slave axis movement both by programmed position and rate information and as a slaved movement under control of the motion of the master axis movement operated as a master clock for modulating said programmed rate information of the slave axis movement, thereby to retain the inherently low error coefficient of the slave axis movement not withstanding the relatively large error coefficient of the master axis movement.

2. The method as in claim 1 and further comprising the step of generating pulses corresponding to increments of movement of the master axis movement in response to its programmed position information and utilizing said pulses for operation of said clock.

3. The method as in claim 2 and further comprising the steps of counting said pulses and reading a new block of said programmed information into storage and a stored block of said programmed information into active information when a predetermined number of said pulses corresponding to a predetermined increment of the master axis movement has been counted.

4. In a system for numerically controlling large masses by programmed numerical information, a multi-axis machine comprising a high inertia, low response, large mass master axis movement having a servo drive for moving the large mass of the master axis movement in response to programmed position information only and without regard for the motion response of the large mass with respect thereto, means for applying said programmed position information to said servo drive, a plurality of low inertia, high response, low mass slave axis movements each having a servo drive for moving its low mass in response to both the programmed position and rate information, means for applying said position and rate information to each said slave axis servo drive, and means comprising a clock operable in accordance with the incremental motion of said large mass of the master axis movement for timing and synchronizing the rate response of the low masses of said slave axis movements to said programmed rate information.

5. In a system for controlling large masses as in claim 4 and wherein said multi-axis machine is a filament winding machine, wherein said large mass of said master axis movement comprises a mandrel having a massive filament would object supported thereon for rotation therewith, and wherein the small mass of one of said slave axis movements comprises a payoff head for paying out and directing the filament to said object.

6. In a system for controlling large masses as in claim 4, said servo drive for said master axis movement having low natural frequency and said servo drives for said slave axis movements having high natural frequency.

7. In a system for controlling large masses as in claim 4, said clock comprising a pulse transducer coupled to said large mass of the master axis movement and responsive to the motion thereof for generating clock pulses providing a measure of said incremental motion of the large mass of the master axis movement, and means timed by said pulses for modulating said programmed rate information for the slave axis movements.

8. In a system for controlling large masses as in claim 4 and wherein said multi-axis machine is a 5-axis filament winding machine having a table and a filament wound object supported thereon for rotation therewith about a Z axis, a carriage mounted for linear movement along an X axis disposed parallel to said Z axis, a ram mounted on said carriage for movement thereon linearly along a Y axis disposed normal to said X and Z axes, a filament payoff head mounted on said ram for angle movements about $\alpha$ and $\beta$ axes, said master axis movement including said table, said filament wound object, a table servo power, a table velocity control for receiving said programmed position information, and said master axis servo drive for rotating the table and its supported object about said Z axis, a first one of said slave axis movements including said payoff head, an $\alpha$ servo power, an $\alpha$ distributor for receiving said programmed position and rate information, and an $\alpha$ servo drive to move the payoff head angularly about said $\alpha$ axis, a second one of said slave axis movements including said payoff head, a $\beta$ servo power, a $\beta$ distributor for receiving said programmed position and rate information, and a $\beta$ servo drive to move the payoff head angularly about said $\beta$ axis, a third one of said slave axis movements including said ram, a ram servo power, a ram distributor for receiving said programmed position and rate information, and a ram servo drive to move the ram along said Y axis, and a fourth one of said slave axis movements including said carriage, a carriage servo power, a carriage distributor for receiving said programmed position and rate information and a carriage servo drive to move the carriage along said X axis.

9. In a system for controlling large masses as in claim 8, said clock comprising a pulse transducer coupled to said table for generating pulses in accordance with the incremental motion thereof, said machine further comprising means for reading said programmed information, means for storing said read information, means for holding said stored information as active information for operating said distributors and said table velocity control, means for reading said read information into said storage, a clock countdown ratio responsive to said active information and controlled by said transducer pulses for operating said distributors in accordance with said active information received directly thereby, and means responsive to a predetermined counted number of pulses corresponding to a predetermined incremental movement of the table for transferring said stored information to active information and for directing the active information respectively to said table velocity control, said distributors, and said clock countdown ratio.

References Cited

UNITED STATES PATENTS

| | | | |
|---|---|---|---|
| 2,964,252 | 12/1960 | Rosenberg | 242—9 |
| 3,015,806 | 1/1962 | Wang et al. | |
| 3,064,173 | 11/1962 | Breen et al. | 318—85 X |
| 3,191,205 | 6/1965 | Gilbert. | |

FOREIGN PATENTS 829,824  3/1960  Great Britain.

STANLEY N. GILREATH, Primary Examiner

U.S. Cl. X.R.

242—7.21; 318—18, 162